(12) United States Patent
Campbell et al.

(10) Patent No.: US 8,231,036 B2
(45) Date of Patent: Jul. 31, 2012

(54) PORTABLE RECREATION SYSTEM FOR MOTORIZED VEHICLES

(76) Inventors: Scott Gerald Campbell, Ada, MI (US); Bradley Adom Weber, Oak Park, MI (US)

(*) Notice: Subject to any disclaimer, the term of this patent is extended or adjusted under 35 U.S.C. 154(b) by 989 days.

(21) Appl. No.: 12/283,598

(22) Filed: Sep. 15, 2008

(65) Prior Publication Data
US 2010/0065593 A1    Mar. 18, 2010

(51) Int. Cl.
*B60R 11/00* (2006.01)

(52) U.S. Cl. ............ 224/527; 224/42.32; 224/521; 224/526

(58) Field of Classification Search .......... 224/518–521, 224/524–527, 42.32, 404, 484, 486, 531, 224/532; 126/25 r, 41 r; 312/324, 329
See application file for complete search history.

(56) References Cited

U.S. PATENT DOCUMENTS

| | | | | |
|---|---|---|---|---|
| 1,408,731 A | * | 3/1922 | Harris | 312/237 |
| 1,511,725 A | * | 10/1924 | Hart | 312/324 |
| 5,029,740 A | * | 7/1991 | Cox | 224/484 |
| 5,106,002 A | * | 4/1992 | Smith et al. | 224/506 |
| 5,263,467 A | * | 11/1993 | Jones | 126/42 |
| 6,293,272 B1 | * | 9/2001 | Harneit | 126/37 B |
| 7,249,771 B1 | * | 7/2007 | Brennan et al. | 280/35 |
| 2002/0043259 A1 | * | 4/2002 | Brennan | 126/41 R |
| 2004/0026946 A1 | * | 2/2004 | Reed et al. | 296/24.3 |
| 2005/0092799 A1 | * | 5/2005 | Morris | 224/484 |
| 2008/0314946 A1 | * | 12/2008 | Owenby | 224/487 |
| 2010/0176170 A1 | * | 7/2010 | O'Hare | 224/519 |

* cited by examiner

*Primary Examiner* — Justin Larson
*Assistant Examiner* — Corey Skurdal

(57) ABSTRACT

A portable recreation and entertainment system for use with a motorized vehicle is provided. The system includes a housing having a generally horizontal base portion and a top portion oriented vertically distal therefrom. A plurality of walls extends between the base and top, connecting the two portions and thereby defining an opening facing away from the vehicle. A first door extends laterally across a lower portion of the opening, and connects to a wall portion to selectively rotate from a closed position to an open position. A second door extends laterally across an upper portion of the opening, and connects to another wall portion to selectively rotate from a closed position to an open position. A support platform is connected to the housing and supportably attached to a rearward end of the vehicle by a support arm that preferably includes a mating member configured to mate with a trailer hitch.

21 Claims, 3 Drawing Sheets

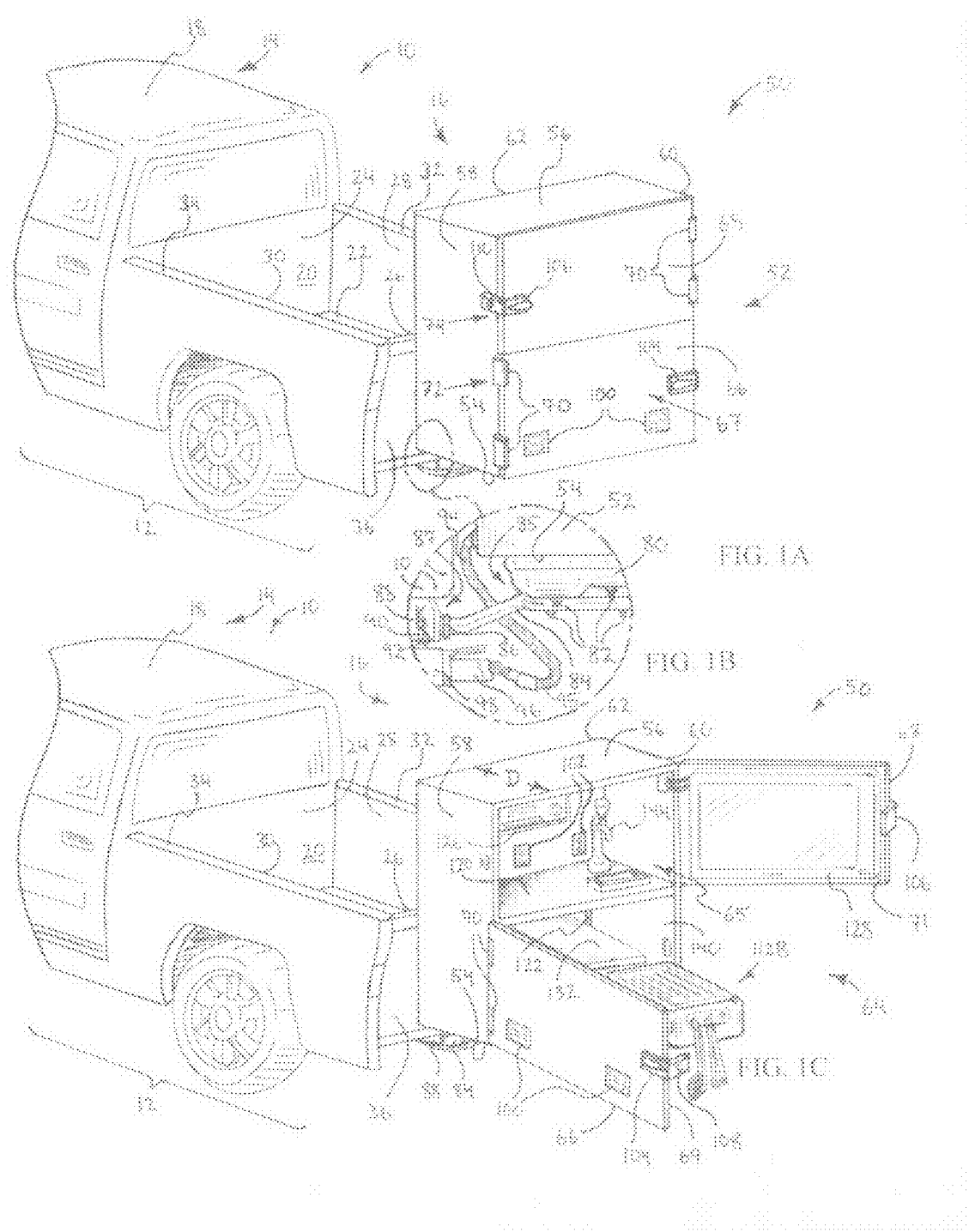

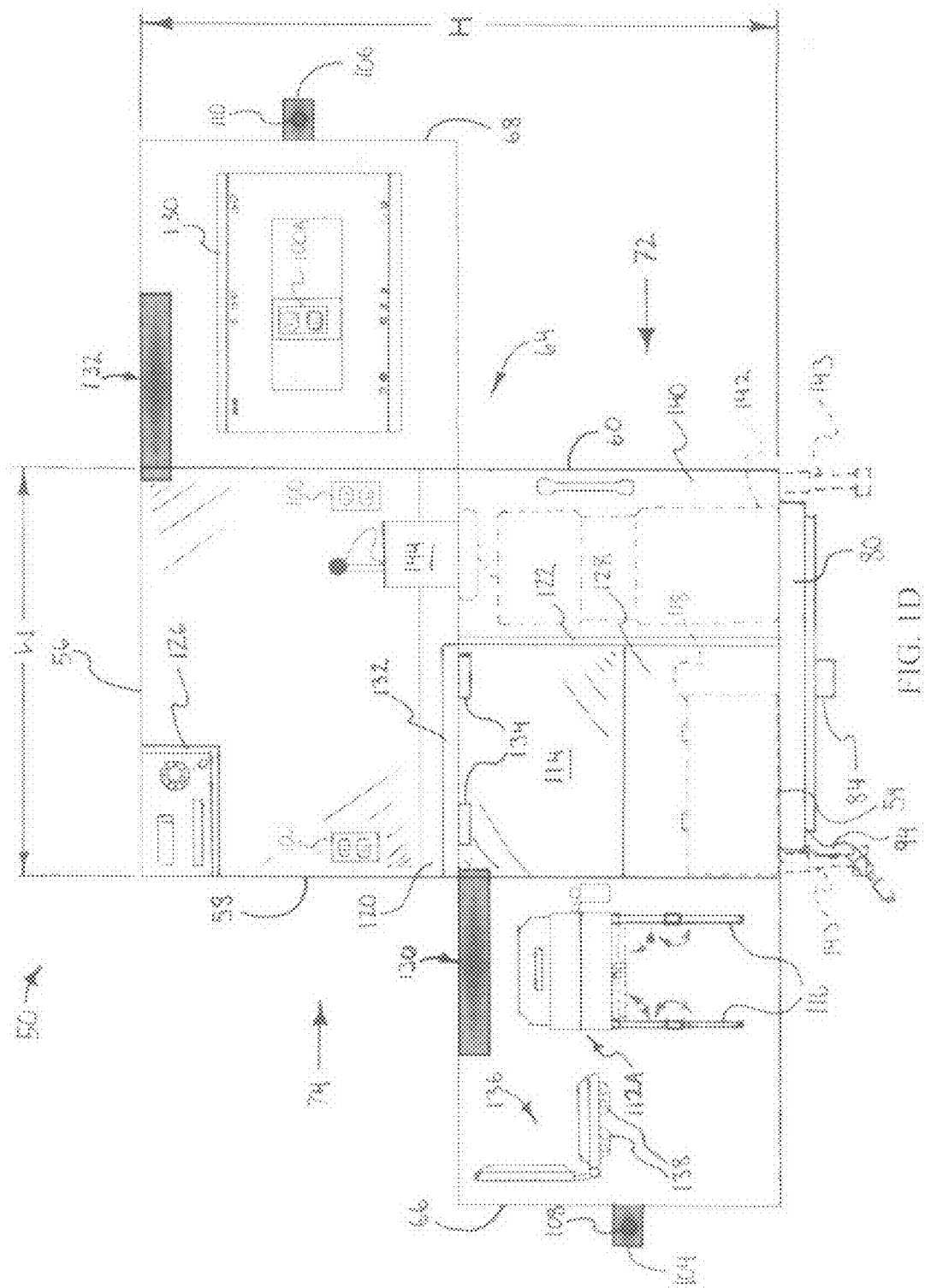

PORTABLE RECREATION SYSTEM FOR MOTORIZED VEHICLES

TECHNICAL FIELD

The present invention relates generally to outdoor amenities, and more specifically to portable recreation devices for use with motorized vehicles offering the convenient storage and transport of cooking, entertainment, refrigeration, and like accessories for outdoor use.

BACKGROUND OF THE INVENTION

During outdoor entertainment events, such as sporting contests, tailgate parties, fireworks, parades, picnics, and the like, it is often desirable to have many of the amenities used in one's home available for out-of-door purposes. In some public locations, limited facilities are provided for communal use, such as picnic tables, free standing grills, and restrooms. Unfortunately, these facilities are often times inconveniently located or already in use, if available at all in that particular location.

It is commonplace for spectators and patrons attending outdoor entertainment events to transport a variety of convenience and luxury items to the event site. For example, patrons of an outdoor entertainment event may erect temporary facilities for such activities as cooking, dining, sleeping, and the like. Such temporary facilities may include, by way of example, foldable chairs and tables, portable barbeques and other cooking appliances, umbrellas, and tents. It is also conventional to transport separate accessories for entertainment, refrigeration, and storage purposes. These accessories can include such items as electric coolers and ice boxes, power generators, stereo and other sound systems, televisions, etc.

Often, people are transported to these types of outdoor activities in a motor vehicle, such as a pickup truck, sport utility vehicle, conversion or minivan, or recreational vehicle. Accordingly, traditional methods of transporting the various outdoor convenience and luxury items noted above consist primarily of utilizing the motor vehicle in which the patrons themselves use to travel to the particular event. The most obvious course is to use the passenger and trunk compartments provided by the vehicle itself to transport these personal effects. However, this means of transport utilizes valuable space inside the vehicle that can be used to move more delicate items.

An alternative means of transporting the various outdoor convenience and luxury items noted above without using the passenger and trunk compartments of the vehicle is by means of a towable trailer that attaches to the rear of the vehicle body, generally to a trailer hitch. Conventional towable trailers generally comprise an open platform or square compartment with an access door, mounted to a two- or four-wheel chassis. The chassis, in turn, includes attaching means for securing the towable trailer to a trailer hitch—traditionally a cantilevered control arm. However, such devices can be costly, and may adversely affect the handling and safety of the towing vehicle.

SUMMARY OF THE INVENTION

A portable recreation and entertainment system for use with a motorized vehicle is provided which is adapted to be easily and quickly mounted to a rearward portion of the vehicle body, and be fully supported thereby. Ideally, the entertainment system is attached to the tow hitch (also known in the art as a tow bar), and is powered through an electrical connection directly with the vehicle (e.g., through a 6- or 7-way trailer cable harness) and/or an internal power source. The entire unit preferably locks into place with a hitch bolt, and is fully supported by tongue weight, i.e., via the connecting trailer support arm.

The portable recreation and entertainment systems described herein provide a self-contained, weather resistant, and fully operable entertainment unit which is accessed by a single large door, or two vertically stacked doors, each capable of opening a full 180 degrees. The present design provides battery stored power for television, video gaming, movie watching, and other similar entertainment. The invention also offers storage for up to 30 liters (approximately 8 gallons) of pressurized beer (e.g., a "half keg" or "pony keg"), mixed alcoholic or non-alcoholic drinks, both carbonated and non-carbonated. Also included in the present design are storage areas for such things as ice, silverware, a DVD player or video gaming unit, a portable barbeque unit (charcoal or gas), a portable table, and other amenities.

According to a one aspect of the present invention, a portable recreation system for use with a motorized vehicle is provided. The vehicle has a vehicle body with a forward end, and a rearward end having a trailer hitch extending therefrom. The recreation system includes a housing with a generally horizontal base portion and a top portion vertically distal therefrom. First, second, and third wall portions extend between the base and top portions, connecting the two portions, and thereby defining an opening that faces away from the vehicle. A support platform is attached, secured, or adhered to the housing, preferably by way of bolts. A support arm that is configured to sustain the weight and geometry of the housing connects the support platform to the rearward end of the vehicle body. The support arm preferably includes a hitch mating member that is configured to selectively mate with and thereby secureably lock the support arm to the trailer hitch.

At least one, but preferably two door members extend laterally across the opening, and pivotably connect to one of the first, second, or third wall portions to selectively rotate from a closed position to an open position. Ideally, a first door member extends laterally across a lower portion of the opening, and pivotably connects to the first wall portion to selectively rotate from a first closed position to a first open position. Similarly, a second door member extends laterally across an upper portion of the opening and operatively connects to the third wall portion to selectively rotate from a second closed position to a second open position. Each door member is preferably rotatably mounted to its respective wall portion by strap hinges, knuckle hinges, strap-n-t hinges, butt hinges, continuous hinges, lift-off hinges, and the like. Latch mechanisms are preferably attached to the first and second door members for selectively securing the first and second door members in their respective closed positions. Additionally or in the alternative, locking mechanisms can be secured to the first and second door members for individually locking each door member in its respective closed positions.

Ideally, at least one tail light fixture is secured to either the first or the second door member. More specifically, the portable recreation system preferably includes first and second tail lights attached, secured, or adhered to an outer surface of the first door member, wherein the first and second tail lights are oriented laterally distal from one another.

Preferably, the housing is configured to accommodate an electric power source. To this regard, one or more electric sockets are incorporated into the housing structure. The electric sockets are connected to the electric power source to distribute electrical power from the power source. The power source can be, by way of example, a gas powered electric generator, a car battery, a marine battery, or like element. Additionally, an electric cable configured to mate with a cable port in the vehicle body extends from the housing. The cable is preferably configured to transmit signals indicative of vehicle braking and turning operations from the vehicle to the various tail light fixtures. The cable is further configured to transfer electric power from the vehicle to the electric outlets mounted to the housing, and to recharge the electric power source.

Preferably, one or more shelves are secured to, and extend laterally between, the first and third walls. Similarly, one or more divider panels extend vertically between the base portion and one of the shelves to define a plurality of storage compartments.

The portable recreation system is adapted to safely and securely store a variety of amenities for easy transport. For example, a portable grilling assembly is preferably secured to an inner surface of the first door member. According to a first alternate embodiment, the grilling assembly is operable to pivot from a generally vertical stowed position to a generally horizontal use position. According to a second alternate embodiment, the portable grilling assembly extends substantially orthogonally from the first inner surface of the first door member in a cantilevered fashion when in the horizontal use position. In either instance, the portable grilling assembly preferably includes at least one vertical support member operatively attached thereto to pivot from a generally parallel stowed position to a generally vertical use position providing any necessary support.

An additional amenity that is preferably included in the portable recreation system is a table top operatively secured to the shelf portion, and adapted to transition from a generally horizontal stowed position, substantially inside the portable recreation system, to a generally horizontal use position, substantially outside the portable recreation system. According to a first alternate embodiment, the table top includes at least one vertical support member operatively attached thereto to pivot from a generally parallel stowed position to a generally orthogonal use position providing any necessary support. According to a second alternate embodiment, the table top extends rearwardly from the at least one shelf portion in a cantilevered fashion when in the horizontal use position. As an alternate variation, a portable table assembly can be secured to the top portion of the housing to selectively detach from a first stowed position to a second use position. One or more seats can also be secured to the first door member to pivot from a generally vertical stowed position to a generally horizontal use position, for use in connection with the table top or independently.

Additionally, a mounting frame is preferably secured to an inner surface of the second door member. The mounting frame is configured to mate with and thereby support a television set. A cooling device is preferably disposed within one of the plurality of storage compartments and configured to receive a large fluid container.

The above features and advantages, and other features and advantages of the present invention will be readily apparent from the following detailed description of the preferred embodiments and best modes for carrying out the present invention when taken in connection with the accompanying drawings.

BRIEF DESCRIPTION OF THE DRAWINGS

FIG. 1A is an isometric or perspective rear schematic illustration of a motor vehicle having attached thereto a portable recreation system in accordance with one embodiment of the present invention, depicted therein in a transport position;

FIG. 1B is a projected side-schematic view of a portion of the portable recreation system of FIG. 1A, provided to illustrate a preferred connection mechanism for securing the portable recreation system to a hitch receiver;

FIG. 1C is an isometric or perspective rear schematic illustration of the portable recreation system of FIG. 1A, depicted therein in a use position;

FIG. 1D is an end view of the portable recreation system of FIG. 1A, as one would observe the portable recreation system from a position behind the vehicle, provided to depict the various convenience accessories that may be incorporated therein;

DESCRIPTION OF THE PREFERRED EMBODIMENTS

Figure 2A:
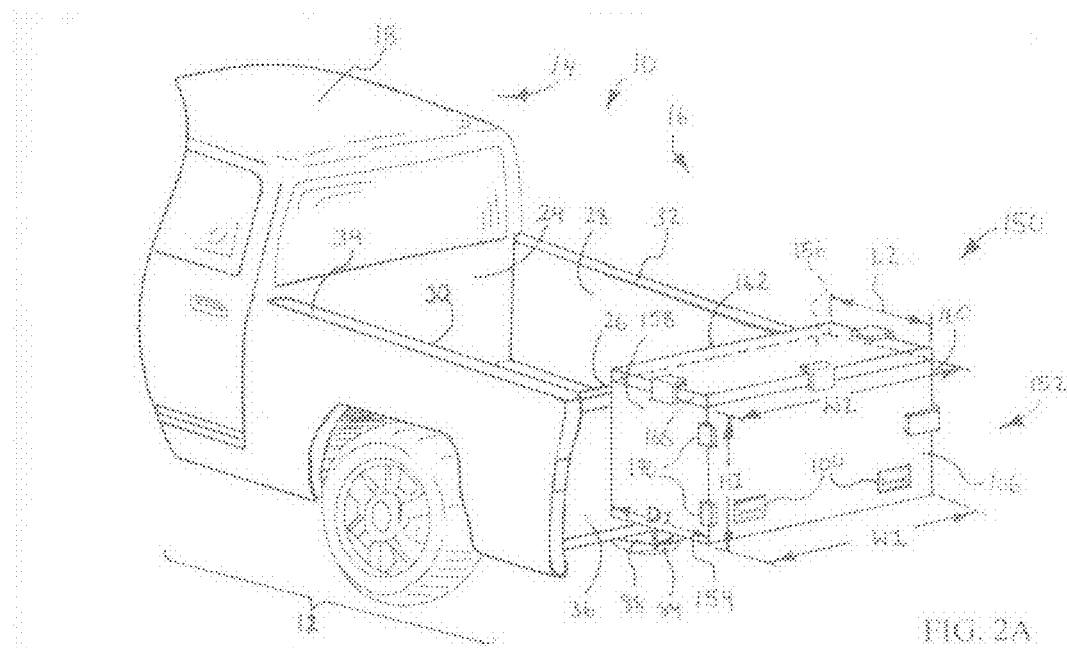
FIG. 2A is an isometric or perspective rear schematic illustration of a motor vehicle having attached thereto a portable recreation system in accordance with another embodiment of the present invention.

Referring now to the Figures, wherein like reference numbers refer to the same or similar components throughout the several views, FIG. 1A is an isometric view of an exemplary motor vehicle, identified generally as 10, having attached thereto a portable recreation and entertainment system, hereinafter "recreation system 50", in accordance with one embodiment of the present invention. Although the vehicle 10 is depicted throughout the several views, namely FIGS. 1A, 1C and 2A, as a standard pickup truck, the recreation system 50 can be incorporated into any vehicle platform, such as sedan- or coupe-type passenger cars, sport utility vehicles (SUV), recreation vehicles, and the like.

The pickup truck 10 has a truck body 12 having a forward end 14 with a cab portion 18, and a rearward end 16 with a bed portion 20 (also referred to in the art as a cargo bed or payload area) fixed, secured, or mounted adjacent to the cab portion 18. The bed portion 20 has a bed floor 22, a front end 24 opposing a rear end 26 (also referred to herein as the "rear vehicle structure"), and first and second sidewalls 28 and 30, respectively, each extending substantially orthogonally from the bed floor 22 to first and second horizontal panels 32 and 34, respectively.

The bed portion 20 also includes a tailgate assembly 36 (also referred to herein as a liftgate or tailgate door) which is preferably rotatably secured, e.g., via horizontal hinge pins (not shown) at the rear end 26 of the bed portion 20, adjacent to the bed floor 22, as seen in FIG. 1A. A latch mechanism having a locking device (not shown) is employed to selectively secure the tailgate assembly 36 in a substantially vertical closed position (shown in FIG. 1A), thereby forming an enclosure between the cab portion 18, first and second sidewalls 28, 30, and the tailgate assembly 36.

In one embodiment of the present invention, illustrated in FIGS. 1A-1D, the recreation system 50 includes a housing, identified generally as 52, having a generally rectangular and substantially horizontal base portion 54 oriented vertically distal from a generally rectangular and substantially horizontal top portion 56. The housing 52 further includes substantially vertical first and second lateral walls 58, 60, respectively, and end wall 62. The first and second lateral walls 58, 60 and end wall 62 extend substantially orthogonally between the bottom and top portions 54, 56 to create an enclosure 65 therebetween, and define an access port or opening 64, as best seen in FIGS. 1C and 1D. The recreation system 50 preferably has a height H, FIG. 1D, of 1.27 meters (m) or approximately 50 inches (in), a width W, FIG. 1D, of 1.4 m, or approximately 55¼ in, and a depth D, FIG. 1C, of 0.65M, or approximately 25½ in. However, other values for the height H, width W, and depth D for the recreation system 50 may be usable within the scope of the present invention.

Ideally, each wall 58, 60, 62 is substantially-flat and generally rectangular, and fabricated from a material known to have a suitable strength for the intended use of the recreation system 50, such as, but not limited to, wood, aluminum, high strength plastics, and the like. The exterior of the recreation system 50 can be finished with an anti-corrosive, thermally insulating, weather proofing, and aesthetically appealing coating (e.g., dichromate paint, zinc plating, etc., not shown.) It is also considered to be within the scope of the claimed invention that each wall 58, 60, 62 take on additional shapes (e.g., a polygon, hexagon, etc.), include rounded or chamfered edges or corners, and have varying cross sections (e.g., crescent, semi-elliptical, etc.).

According to the embodiment of FIGS. 1A-1D, the housing 52 also includes a first large door member 66 vertically adjacent and substantially coplanar to a second large door member 68. The first door member 66 extends laterally across a lower portion 72 of the opening 64, whereas the second door member 68 extends laterally across an upper portion 74 of the opening 64. The first door member 66 is secured, mounted, or attached, preferably in a rotatable manner, e.g., via one or more vertical hinges 70, to the first lateral wall 58 to selectively rotate from a first closed position, FIG. 1A, to a first open position, FIGS. 1C and 1D. In a similar respect, the second door member 68 is secured, mounted, or attached, preferably in a rotatable manner, e.g., via one or more vertical hinges 70, to the second lateral wall 60 to selectively rotate from a second closed position, FIG. 1A, to a second open position, FIGS. 1C and 1D. By way of example, the vertical hinges 70 can be strap hinges, strap-n-t hinges, butt hinges, knuckle hinges, quick-pin hinges, continuous hinges, lift-off hinges, or any combination thereof.

When the first and second door members 66, 68 are in their respective closed positions, a weather proof, thermally insulated, resilient container is created and the recreation system 50 is in a transport state or position, as seen in FIG. 1A. In contrast, when the first and second door members 66, 68 are in their respective open positions, the opening 64 and, thus, the contents of the portable recreation system 50 are accessible, and the recreation system 50 is in a use state or position, as seen in FIG. 1C. To this regard, the first and second door members 66, 68 preferably include first and second latch mechanisms 104 and 106, respectively, configured to selectively secure the first and second door members 66, 68 in their respective closed positions, FIG. 1A. In addition or as an alternative to the first and second latch mechanisms 104, 106, the first and second door members 66, 68 can respectively include a first locking mechanism 108, FIG. 1C, and second locking mechanism 110, FIG. 1A, configured to selectively lock the first and second door members 66, 68 in their respective closed positions of FIG. 1A. Finally, it is also preferred that the first and second door members 66, 68 include first and second securing devices 130 and 132, respectively, configured to selectively hold the first and second the door member 66, 68 in their respective open positions, as best seen in FIG. 1D.

Turning to FIG. 1B, the portable recreation system 50 also includes a support platform 80 attached, secured, or adhered to the housing 52, preferably to the base portion 54 by way of bolts 82. A cantilevered, preferably tubular support arm 84, welded at a proximal end 85 to a peripheral edge of the support platform 80, extends longitudinally between the vehicle 10 and the support platform 80, and mates at distal end 87 with the rear vehicle structure 26. Preferably a substantially square hitch mating member 86 located at the distal end 87 of the support arm 84 inserts into a trailer hitch 88 extending from the rear vehicle structure 26. The support arm 84 is secured in a connected position with the trailer hitch 88, as shown in FIG. 1B, by a cotter pin 90 coupled with a locking pin 92 that is fed through aligned, cooperating apertures (not shown) in the support arm 84 and trailer hitch 88.

The support arm 84 must be fabricated from a material that is strong enough (i.e., high modulus and yield strength) to support the recreation system 50, such as, by way of example, cast iron, stainless steel, and other ferrous metallic materials, high strength plastics, composite materials, etc. In addition, the width of the platform 80 and length of the support arm 84 must be sufficient to accommodate to size and geometry (i.e., height H, width W, and depth D) of the portable recreation system housing 52.

Also shown in FIG. 1B is a trailer connector cable 94, such as a 6- or 7-way wiring harness, with a molded cable 95 extending from the end wall 62 of housing 52, and a connector head 96 configured to be received by, mate with, or insert into a corresponding car end connector 98 extending from the rear vehicle structure 26, substantially proximate to the hitch 88 and tailgate assembly 36. The connector cable 94 is configured to transmit signals indicative of vehicle braking and turning operations from the vehicle 10 to one or more tail light fixtures 100 incorporated into the housing 52, e.g., secured to an outer surface 67 of the first door member 66. Preferably, the cable 94 is further configured to transfer electric power from the vehicle 10 to one or more electric outlets 102 incorporated into the housing 52, e.g., mounted to end wall 62, inside the enclosure 65, and to recharge an internal electric power source 118, discussed below.

As depicted in FIGS. 1C and 1D, the portable recreation system 50 is adapted to safely and securely store a variety of amenities for easy transport and outdoor use. To this regard, one or more shelf portions, represented herein by horizontal shelf 120, are mounted, secured, or attached to, and extend laterally between the first and second lateral walls 58, 60, dissecting the portable recreation system 50 into vertical segments and providing a working surface thereon. Similarly, one or more divider panels, represented herein by dividing wall 122, are mounted, secured, or attached to, and extend vertically between the base portion 54 and one of the shelf portions, e.g., horizontal shelf 120, to dissect the portable recreation system 50 into horizontal segments, thereby defining a plurality of storage compartments, as will be explained in detail hereinbelow. Finally, one or more cargo or cubby holes 126 can be incorporated into housing 52 for storing a DVD player, video gaming unit, or like element.

One example of the types of amenities that the portable recreation system 50 is adapted to safely and securely store, a portable cooking device is secured to a first inner surface 69 of the first door member 66. Preferably, a portable grilling assembly 112A, as seen in FIG. 1D, extends substantially orthogonally from the first inner surface 69 of the first door member 66 in a cantilevered fashion when in a horizontal use position. In this instance, the portable grilling assembly 112A is positioned proximate to the first lateral wall 58 so that the portable grilling assembly 112A fits into a grill storage space 114, defined in part by horizontal shelf 120 and dividing wall 122, when the first door member 66 is pivoted into the closed position shown in FIG. 1A.

As an alternative, a portable grilling assembly 112B, as seen in FIG. 1C, is secured, mounted, or attached, preferably in a pivotable manner, e.g., via one or more lateral hinges (not shown), to the first inner surface 69 of the first door member 66. In this particular configuration, the portable grilling assembly 112B is operable to pivot from a generally vertical, stowable position (not shown) to a generally horizontal use position, as seen in FIG. 1C. In either instance, one or more vertical support members 116 can be attached to the portable grilling assembly 112A, 112B. Each support member 116 is configured to pivot from a generally parallel stowed position, shown hidden in FIG. 1D, to a generally orthogonal use position, shown solid in FIG. 1D.

An electric power source, such as a 12-volt lead-acid car battery, a marine battery, or gasoline powered electric generator, generally indicated in FIG. 1D as hidden box 118, is accommodated by a first storage compartment 128 in the housing 52. The electric power source 118 is operatively connected to the one or more electric sockets 100 mounted to the housing 52, e.g., by way of 20-guage TAP coated electric wires, to distribute electric power to various items (not shown) requiring direct current (DC) power. For example, a television set 128, as best seen in FIG. 1C, is supportably attached or secured to a mounting frame 130, as best seen in FIG. 1D, mounted to a second inner surface 71 of the second door member 68 adjacent to an electric socket 100A. The electric socket 100A is operatively connected to the electric power source 118 to provided the necessary electricity to power the television set 128.

Still referring to FIGS. 1C and 1D, a table top 132 is mounted to the horizontal shelf 120 to transition from a generally horizontal stowed position within the enclosure 65, FIG. 1D, to a generally horizontal use position, 1C. The table top 132 can be mounted to the shelf portion 120 via horizontal hinge pins or sliding tracks, collectively represented herein by attachment means 134, to either slide or pivot from the horizontal stowed position to the horizontal use position. The table top 132 preferably extends rearward from the housing 52 in a cantilevered fashion when in the horizontal use position.

Other amenities that may be included in the portable recreation system 50 of the present invention includes one or more seat members 136 mounted, attached, or secured, preferably in a rotatable manner, e.g., via lateral hinge pins 138, to pivot from a generally vertical stowed position to a generally horizontal use position. In addition, a cooling or cold storage device, such as refrigerator 140, is incorporated into the lower portion 72 of the housing 52, and configured to accommodate up to 30 liters (approximately 8 gallons) of alcoholic or non-alcoholic beverages, carbonated or non-carbonated, such as a half keg of pressurized beer, shown hidden in FIG. 1D as 142. To this regard, a fluid dispensing device, such as tap or faucet 144, extends orthogonal from the horizontal shelf 120 to provide convenient access to the fluid contents of the cooling or cold storage device, i.e., refrigerator 140. Notably, the list of amenities adaptable to be incorporated into the portable recreation system 50 provided herein is intended as exemplary and thus, should not be considered exclusive or limiting in any way.

It is also preferred that the housing 52 include means for simplifying the raising, attaching, extracting, and lowering of the recreation system 50, shown hidden in FIG. 1D in an exemplary embodiment as a plurality of telescoping tubular support legs 143. Locking and unlocking mechanisms (not shown) are preferably be attached to each of the support legs 143 so that, when unlocked, each support leg would slide from a stowed position inside the housing 52, to a use position outside the housing 52. Wheels (not shown) may also be attached to each support leg 143. Alternatively, the means for simplifying the raising, attaching, extracting, and lowering of the recreation system 50 can comprise a rectangular structure (not shown) adapted to raise and lower the housing 52 by way of a crank, pneumatic actuator, and the like.

Figure 2B:
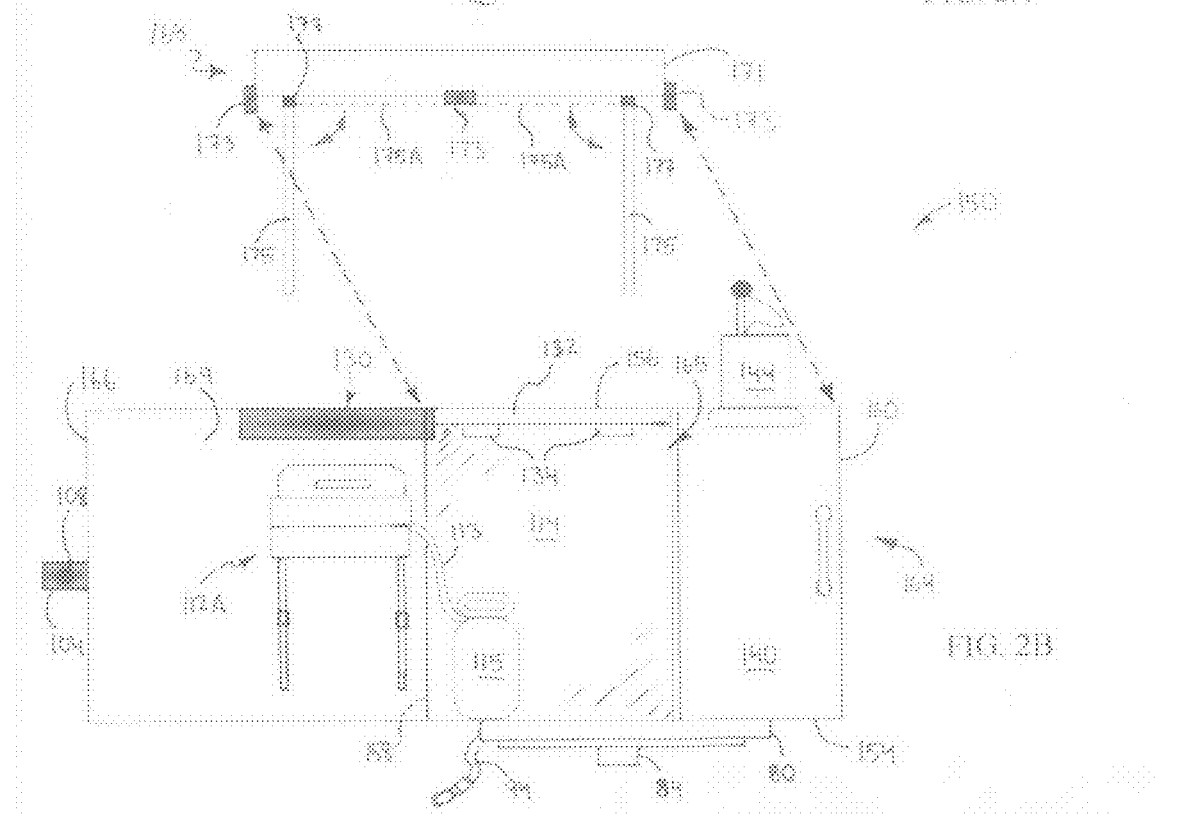
FIG. 2B is an exploded end view of the portable recreation system of FIG. 2A, as one would observe the portable recreation system from a position behind the vehicle, provided to depict the various convenience accessories that may be incorporated therein.

FIGS. 2A and 2B illustrate an additional embodiment of the present invention that functions similarly to the previously described portable recreation system 50 of FIGS. 1A-1D. For simplicity and brevity purposes, like reference numbers are used in FIGS. 2A and 2B to refer to like components from FIGS. 1A-1D. Correspondingly, any components of FIGS. 2A and 2B identified with a common reference number to a respective component of FIGS. 1A-1D should be considered to be identical unless specified otherwise. Furthermore, the embodiment depicted in FIGS. 2A and 2B, like FIGS. 1A-1D, is not to scale and illustrated herein purely for instructive purposes; thus, the particular dimensions of the drawings presented herein are not to be considered limiting.

The portable recreation system 150, according to the embodiment of FIGS. 2A and 2B, includes a housing, identified generally as 152, having a generally rectangular and substantially horizontal base portion 154 oriented vertically distal from a generally rectangular and substantially horizontal top portion, shown hidden as 156. The housing 52 further includes substantially vertical first and second lateral walls 158, 160, respectively, and end wall 162. The first and second lateral walls 158, 160 and end wall 162 extend substantially orthogonally between the bottom and top portions 154, 156 to create an enclosure 165, therebetween and define an access port or opening 164, as seen in FIG. 2B.

Ideally, each wall 158, 160, 162 is substantially-flat and generally rectangular, and fabricated from a material known to have a suitable strength for the intended use of the recreation system 150. The exterior of the recreation system 150 is preferably finished with an anti-corrosive, thermally insulating, weather proofing, and aesthetically appealing coating. It is also considered to be within the scope of the claimed invention that each wall 158, 160, 162 take on additional shapes, include rounded or chamfered edges or corners, and have varying cross sections.

According to the embodiment of FIGS. 2A-2B, the housing 152 also includes a large door member 166, which extends laterally across the opening 164. The door member 166 is secured, mounted, or attached, preferably in a rotatable manner, e.g., via one or more vertical hinges 170, to the first lateral wall 158 to selectively rotate from a closed position, as best seen in FIG. 2A, to an open position, as best seen in FIG. 2B. For example, the vertical hinges 70 can be strap hinges, strap-n-t hinges, butt hinges, knuckle hinges, quick-pin hinges, continuous hinges, lift-off hinges, or any combination thereof.

When the door member 166 is in the closed positions, a weather proof, thermally insulated, resilient container is created, and the recreation system 150 is in a transport position, as seen in FIG. 2A. In contrast, when the door member 166 is in the open position, the opening 164 and, thus, the contents of the portable recreation system 50 are accessible, and the recreation system 50 is in a use state or position, as seen in FIG. 1C. To this regard, the door member 166 preferably includes a first latch mechanism 104 configured to selectively secure the door member 166 in the closed position of FIG. 2A. In addition or as an alternative to the first latch mechanism 104, the door member 166 can include a first locking mechanism 108 configured to selectively lock the door member 166 in the closed position. Finally, it is also preferred that the door member 166 include a first securing device 130 configured to selectively hold the door member 166 in the open positions, as best seen in FIG. 2B.

Similarly to the embodiment of FIGS. 1A-1D, the portable recreation system 150 is adapted to safely and securely store a variety of amenities for easy transport and outdoor use. For example, the portable recreation system 150 is adapted to safely and securely store a portable cooking device, such as portable grilling assembly 112A, secured to a first inner surface 169 of the door member 166. The portable grilling assembly 112A, extends substantially orthogonally from the first inner surface 169 of the first door member 166 in a cantilevered fashion when in a horizontal use position. In this instance, the portable grilling assembly 112A is positioned proximate to the first lateral wall 158 so that the portable grilling assembly 112A fits into a grill storage space 114, defined in part by top portion 156 and dividing wall 122, when the door member 166 is pivoted into the closed position shown in FIG. 2A. Finally, the portable grilling assembly 112A is operatively attached, e.g., via hose 113 to a propane tank 115, also stored in the enclosure 165.

Still referring to FIG. 2B, a table top 132 may be mounted to the top portion 156 to transition from a generally horizontal stowed position within the enclosure 165, to a generally horizontal use position, 1C. The table top 132 can be mounted to the top portion 156 via horizontal hinge pins or sliding tracks, collectively represented herein by attachment means 134, to either slide or pivot from the horizontal stowed position to the horizontal use position. The table top 132 preferably extends rearward from the housing 152 in a cantilevered fashion when in the horizontal use position.

It is also preferred that a detachable picnic-type table (hereinafter "detachable table 168" be incorporated into the portable recreation system 150 embodiment of FIGS. 2A and 2B. The detachable table 186 is configured to selectively lock or attach, e.g., via a plurality of latch devices 173 disposed about its periphery, to the top portion 156 of the housing 152. The detachable table 168 includes a substantially rectangular, flat table top portion 171 having a width W2 and length L2 that are substantially equivalent to the width W1 and depth D1, respectively, of the recreation system 152. In addition, a plurality of legs 175 are attached at a proximal end to the table top portion 171, and adapted to pivot, e.g., via brackets 177, from a substantially horizontal stowable position, shown as hidden lines 175A in FIG. 2B, to a substantially vertical support position, shown as solid lines 175 in FIG. 2B.

Another amenity that may be included in the portable recreation system 150 of the present invention includes, among other things, a cooling or cold storage device, such as refrigerator 140, incorporated adjacent to the grill storage space 114, and configured to accommodate up to 30 liters (approximately 8 gallons) of alcoholic or non-alcoholic beverages, carbonated or non-carbonated, such as half keg 142 of FIG. 1D. To this regard, a fluid dispensing device, such as tap or faucet 144, extends orthogonal from the top portion 156 to provide convenient access to the fluid contents of the cooling or cold storage device, i.e., refrigerator 140.

While the best modes for carrying out the invention have been described in detail, those familiar with the art to which this invention relates will recognize various alternative designs and embodiments for practicing the invention within the scope of the appended claims.

The invention claimed is:

1. A portable recreation system for use with a motorized vehicle having a vehicle body with a forward end and a rearward end having a trailer hitch extending therefrom, the recreation system comprising:
 a housing Including:
  a generally horizontal base portion;
  a top portion vertically distal from said base portion;
  first, second, and third wall portions extending substantially perpendicularly between said base portion and top portion to connect said base portion to said top portion and thereby define an opening facing away from the vehicle;
  at least one door member extending laterally across said opening and operatively connected to one of said first, second, and third wall portions to selectively rotate from a closed position to an open position;
 a support platform operatively connected to said housing;
 a support arm operatively connecting said support platform to the rearward end of the vehicle body and configured to support said housing;
 wherein said at least one door member includes first and second door members, wherein said first door member extends laterally across a lower portion of said opening and operatively connected to said first wall portion to selectively rotate from a first closed position to a first open position, and wherein said second door member extends laterally across an upper portion of said opening and operatively connected to said third wall portion to selectively rotate from a second closed position to a second open position;
 a portable milling assembly operatively secured to a first inner surface of said first door member, wherein said portable grilling assembly is operable to pivot from a generally vertical stowed position to a generally horizontal use position assembly, and wherein said portable grilling assembly includes at least one vertical support member operatively attached thereto to pivot from a generally parallel stowed position to a generally orthogonal use position.

2. The portable recreation system of claim 1, wherein said support arm includes a hitch mating member operatively configured to selectively mate with and thereby secureably lock said support arm to the trailer hitch.

3. The portable recreation system of claim 1, wherein said support platform is secured to said housing by way of a plurality of bolts.

4. The portable recreation system of claim 1, further comprising: a cable extending from said housing and configured to mate with a cable port in the vehicle body.

5. The portable recreation system of claim 4, wherein said cable is operatively configured to transmit signals indicative of vehicle braking and turning operations from the vehicle to said at least one tail light fixture, and wherein said cable is further configured to transfer electric power from the vehicle to one or more electric outlets mounted to said housing.

6. The portable recreation system of claim 1, wherein each of said first and second door members is operatively secured to their respective wall portions by at least one of a strap hinge, knuckle hinge, quick-pin hinge, strap-n-t hinge, a butt hinge, a continuous hinge, and a lift-off hinge.

7. The portable recreation system of claim 1, further comprising: at least one tail light fixture operatively secured to one of said first and second door members.

8. The portable recreation system of claim 7, wherein said at least one tail light fixture includes first and second tall lights operatively secured to an outer surface of said first door member and oriented laterally distal from one another.

9. The portable recreation system of claim 1, further comprising: first and second latch mechanisms respectively attached to said first and second door members and operable to selectively secure said first and second door members in said respective closed positions.

10. The portable recreation system of claim 1, further comprising: first and second locking mechanisms respectively secured to said first and second door members and operable to lock said first and second door members in said respective closed positions.

11. The portable recreation system of claim 1, wherein said portable grilling assembly extends substantially orthogonally from said first inner surface of said first door member in a cantilevered fashion when in a horizontal use position.

12. The portable recreation system of claim 1, further comprising: at least one seat member operatively secured to said first door member to pivot from a generally vertical stowed position to a generally horizontal use position.

13. The portable recreation system of claim 1, further comprising: a mounting frame secured to a second inner surface of said second door member and operable to mate with and thereby support a television set.

14. The portable recreation system of claim 1, further comprising: an electric power source housed in said housing; at least one electric socket mounted to said housing and operatively connected to said electric power source to distribute electrical power from said power source.

15. The portable recreation system of claim 14, wherein said power source is one of a gas powered electric generator, a car battery, a marine battery, and combinations thereof.

16. The portable recreation system of claim 1, further comprising: at least one shelf portion extending laterally between said first and third wall portions and operatively secured thereto.

17. The portable recreation system of claim 16, further comprising: a table top operatively secured to said at least one shelf portion to transition from a generally horizontal stowed position to a generally horizontal use position.

18. The portable recreation system of claim 17, wherein said table top includes at least one vertical support member operatively attached thereto to pivot from a generally parallel stowed position to a generally orthogonal use position.

19. The portable recreation system of claim 17, wherein said table top extends rearwardly from said at least one shelf portion in a cantilevered fashion when in said horizontal use position.

20. The portable recreation system of claim 17, further comprising: at least one divider panel extending substantially vertically between said base portion and said at least one shelf portion to define a plurality of storage 5 compartments.

21. The portable recreation system of claim 20, further comprising: a cooling device disposed within one of said plurality of storage compartments and configured to receive a large fluid container.

* * * * *